United States Patent [19]
Callicotte et al.

[11] Patent Number: 5,910,944
[45] Date of Patent: *Jun. 8, 1999

[54] RADIO TELEPHONE AND METHOD FOR OPERATING A RADIOTELEPHONE IN SLOTTED PAGING MODE

[75] Inventors: Mark J. Callicotte, Oak Park; Brian D. Storm, Round Lake Beach, both of Ill.

[73] Assignee: Motorola, Inc., Schaumburg, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/808,555

[22] Filed: Feb. 28, 1997

[51] Int. Cl.$^6$ .................................................. H04J 13/04
[52] U.S. Cl. .................... 370/311; 370/320; 370/335; 370/342; 455/38.3
[58] Field of Search .................................... 370/311, 320, 370/335, 342, 332; 375/205, 208; 455/38.1, 403, 38.3, 343, 574; 340/825.44, 825.49

[56] References Cited

U.S. PATENT DOCUMENTS

| | | | |
|---|---|---|---|
| 5,258,995 | 11/1993 | Su et al. | 375/206 |
| 5,299,228 | 3/1994 | Hall | 375/1 |
| 5,363,375 | 11/1994 | Chuang et al. | 455/403 |
| 5,377,183 | 12/1994 | Dent | 370/311 |
| 5,392,287 | 2/1995 | Tiedemann, Jr. et al. | 370/95.1 |
| 5,416,435 | 5/1995 | Jokinen et al. | 327/113 |
| 5,491,718 | 2/1996 | Gould et al. | 375/205 |
| 5,530,716 | 6/1996 | Lipa | 370/342 |
| 5,596,571 | 1/1997 | Gould et al. | 370/335 |
| 5,602,513 | 2/1997 | De Loe, Jr. | 331/25 |
| 5,602,903 | 2/1997 | LeBlanc et al. | 455/456 |
| 5,649,299 | 7/1997 | Battin et al. | 370/311 |
| 5,673,259 | 9/1997 | Quick, Jr. | 455/38.3 |
| 5,678,227 | 10/1997 | Connell et al. | 370/311 |

OTHER PUBLICATIONS

J. Hinderling et al., "CDMA Mobile Station Modem ASIC", *IEEE Journal of Solid State Circuits,* vol. 28, No. 3, Mar. 1993, pp. 253–260.

CDMA Mobile Station Modem ASIC Technical Manual, 1994, pp. 4–26 through 4–36.

*Primary Examiner*—Dang Ton
*Assistant Examiner*—Phirin Sam
*Attorney, Agent, or Firm*—John G. Rauch

[57] ABSTRACT

Prior to entry into a low-power sleep mode, a radiotelephone (104) in a radiotelephone system (100) calculates in advance the timing required to wake up selected portions of the radiotelephone and stores the calculated wakeup times in registers (216). Also prior to entry into sleep mode, local timing of the radiotelephone is synchronized to received PN roll boundaries from the radiotelephone system. In the sleep mode, the radiotelephone uses a sleep timer (210) to simulate system timing. When the sleep timer (210) matches the stored wakeup times, the radiotelephone re-activates the selected portions of the radiotelephone, such as an oscillator (116) and a radio frequency portion (109) of an analog front end (108), to exit the sleep mode and reacquire communication with the system. This also permits an early exit from sleep mode, for example to service an interrupt, while maintaining system timing.

17 Claims, 7 Drawing Sheets

RADIO TELEPHONE AND METHOD FOR OPERATING A RADIOTELEPHONE IN SLOTTED PAGING MODE

CROSS REFERENCE TO RELATED APPLICATIONS

The present application is related to application Ser. No. 08/808,275 (still pending), entitled "Radiotelephone and Method For Clock Calibration For Slotted Paging Mode in a CDMA Radiotelephone System," filed on the same date herewith and assigned to the assignee of the present invention.

FIELD OF THE INVENTION

The present invention generally relates to reducing power consumption in portable radios such as radiotelephones. More particularly, the present invention relates to a method for operating a radiotelephone in slotted paging mode in a Code Division Multiple Access (CDMA) radiotelephone system.

BACKGROUND OF THE INVENTION

Slotted paging mode is a form of discontinuous reception (DRX) operation for a battery-operated mobile radio such as a cellular radiotelephone. The mobile radio is configured for radio communication with one or more remote base stations in a radiotelephone system. In slotted paging mode, when the radiotelephone (also referred to as a mobile station) is in an idle mode (i.e., not engaged in a call), the radiotelephone does not continuously monitor a paging channel but generally remains in a low power state.

Slotted paging mode is critical to the life of the battery of the radiotelephone. The goal of slotted mode operation is to reduce the on time of the radio to a minimum and to power down as much of the radio as possible during sleep periods. In the idle state, the radiotelephone wakes up only during slots preassigned by the radiotelephone system or to process some other condition, such as a user input.

When recovering from a sleep period, the radio must reacquire a radio frequency (RF) link with a base station in the radiotelephone system. Link acquisition and other operations including communication protocols for such a system are defined in an air interface specification. One example of such an specification is Telecommunications Industry Association/Electronic Industry Association (TIA/EIA) Interim Standard IS-95, "Mobile Station-Base Station Compatibility Standard for Dual-Mode Wideband Spread Spectrum Cellular System" (IS-95). IS-95 defines a direct sequence code division multiple access (DS-CDMA or CDMA) radiotelephone system.

To reacquire a RF link, a radiotelephone in a CDMA system must be synchronized with system time, which is the timing maintained by base stations and a network controller in the CDMA system. Timing for the forward link (base station to mobile station) must be maintained by the radiotelephone with the expectation that, when an assigned slot occurs, the radio can wake up quickly, make corrections for timing uncertainties and be ready to acquire and process the paging channel.

Synchronization with the forward link involves alignment of locally generated pseudorandom noise (PN) sequences with PN sequences transmitted by a base station on a pilot channel. The transmitted sequences include a "short PN" sequence which repeats every 26⅔ ms and a "long PN" sequence which repeats once every 41 days. The radiotelephone contains sequence generators which generate short PN and long PN sequences identical to those used by the base station. The radiotelephone uses a searcher receiver or other mechanism for aligning the short PN sequence with those received from a base station. Once the pilot channel has been acquired, the radiotelephone acquires a synchronization channel and a paging channel. The radiotelephone can then correctly demodulate traffic channels and establish a full duplex link with the base station.

When waking up after a sleep time, the radiotelephone must synchronize with the long PN sequence and short PN sequence. Both the short PN sequence and the frame boundary repeat with reasonable frequency in an IS-95 system. Frame boundaries occur on every third PN roll boundary. A PN roll boundary is defined as the short PN sequence rolling back to its initial value. At the mobile station, the short PN and long PN sequences are generated using a linear sequence generator (LSG). LSGs are described by polynomials and implemented using shift registers and exclusive-or gates. Since the short PN sequence repeats only every 26⅔ ms, when exiting sleep the LSG can be conveniently stopped at a particular phase in the sequence until the phase correlates with the system PN. The short PN LSG is then restarted, in synchronization with system timing.

The long PN sequence, however, repeats only every 41 days. It is impractical to stop the long PN generator of the radiotelephone (for example, when it is time to sleep), then rapidly clock it to catch up with the system's long PN when it is time to wake up.

Since the short PN sequence and long PN sequence transmitted by the system vary predictably with time, acquiring the PN sequences requires that an accurate time reference be kept at the mobile station during sleep mode. The appropriate PN sequences can be determined for correlation with the system PN sequences upon exit from sleep mode. However, maintaining a highly accurate timing reference requires relatively high power dissipation, which is inconsistent with a low power sleep mode.

In addition to exiting sleep mode during assigned slots, the radiotelephone may also be required to wake up to process or respond to other events occurring asynchronously in the radio. One example of such an event is a user input, such as a keypress of the keypad of the radiotelephone. Response to such an input should be rapid, with no perceptible delay for the user.

Accordingly, there is a need for a method and apparatus for controlling entrance to and exit from slotted paging mode in a mobile station such as a radiotelephone. There is a further need for a low power method and apparatus for keeping accurate time in a mobile station such as a radiotelephone.

BRIEF DESCRIPTION OF THE DRAWINGS

The features of the present invention, which are believed to be novel, are set forth with particularity in the appended claims. The invention, together with further objects and advantages thereof, may best be understood by making reference to the following description, taken in conjunction with the accompanying drawings, in the several figures of which like reference numerals identify identical elements, and wherein:

DETAILED DESCRIPTION OF A PREFERRED EMBODIMENT

Figure 1:
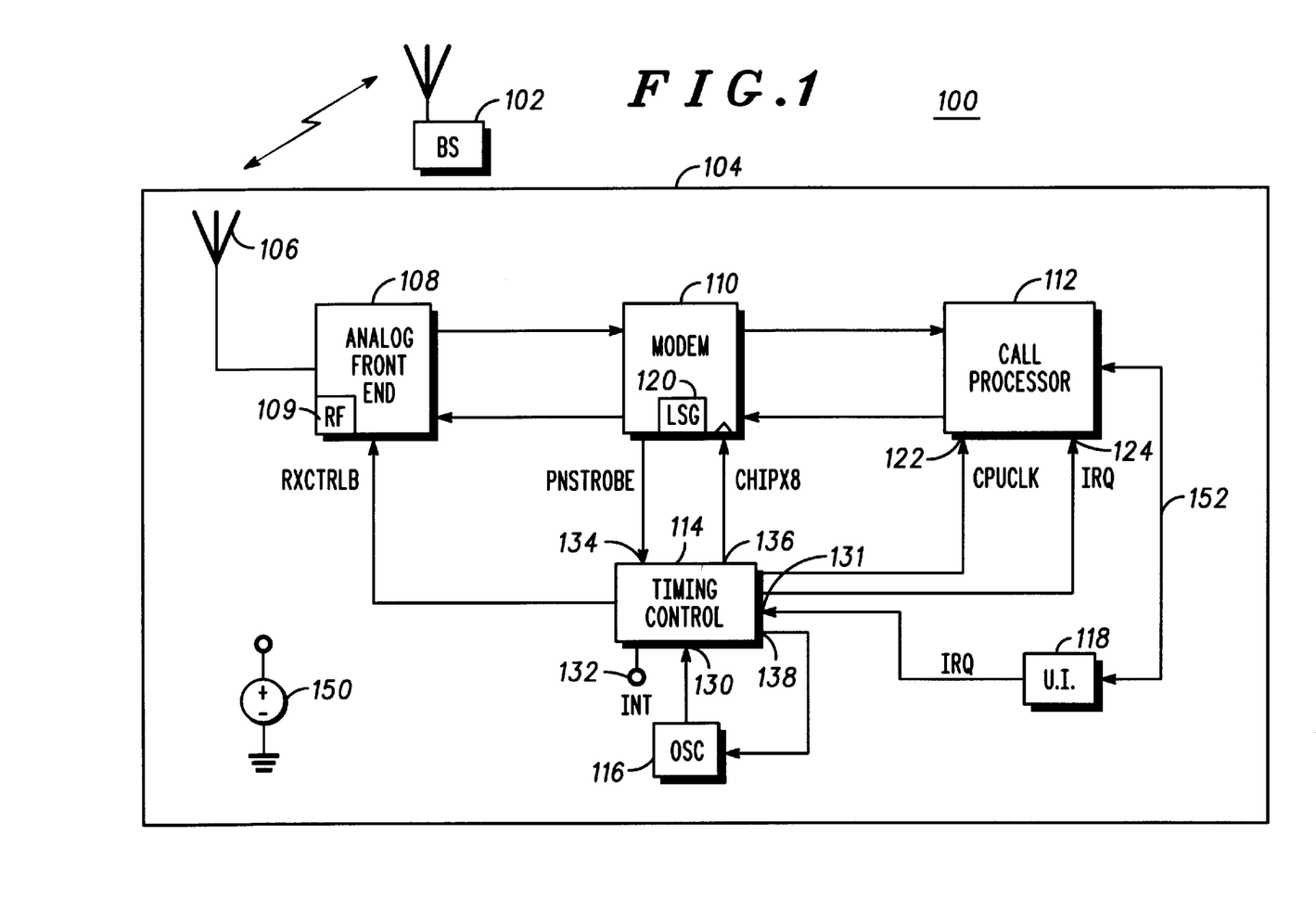
FIG. 1 is a block diagram of a radiotelephone system.

Referring now to FIG. 1, a radiotelephone system 100 includes a plurality of base stations such as base station 102 configured for radio communication with one or more mobile stations including a Code Division Multiple Access (CDMA) radiotelephone such as radiotelephone 104. The radiotelephone 104 is configured to receive and transmit direct sequence code division multiple access (DS-CDMA) signals to communicate with the plurality of base stations, including base station 102. In the illustrated embodiment, the radiotelephone system 100 is a CDMA radiotelephone system operating according to TIA/EIA Interim Standard IS-95, "Mobile Station-Base Station Compatibility Standard for Dual-Mode Wideband Spread Spectrum Cellular System," operating at 800 MHz. Alternatively, the radiotelephone system 100 could operate in accordance with other CDMA systems including PCS systems at 1800 MHz or with any other suitable digital radiotelephone systems.

The base station 102 transmits spread spectrum signals to the radiotelephone 104. The symbols on the traffic channel are spread using a Walsh code in a process known as Walsh covering. Each mobile station such as the radiotelephone 104 is assigned a unique Walsh code by the base station 102 so that the traffic channel transmission to each mobile station is orthogonal to traffic channel transmissions to every other mobile station. The symbols are spread using a short PN sequence or code, which repeats every 26⅔ ms and a long PN sequence or code, which repeats every 41 days. Communication on the radio frequency (RF) link between a base station and the radiotelephone 104 is in the form of chips at a chip rate of 1.2288 Mega-chips per second. A chip is a data bit.

The radiotelephone 104 includes an antenna 106, an analog front end 108, a modem 110, a call processor 112, a timing controller 114, an oscillator 116, a user interface 118 and a battery 150. The battery 150 provides operating power to the other components of the radiotelephone 104.

The antenna 106 receives RF signals from the base station 102 and from other base stations in the vicinity. Received RF signals are converted to electrical signals by the antenna 106 and provided to the analog front end 108. The analog front end includes an RF portion 109 including circuitry such as a receiver and transmitter which may be powered down in slotted paging mode. The analog front end 108 filters the signals and provides conversion to baseband signals.

The analog baseband signals are provided to the modem 110, which converts them to streams of digital data for further processing. The modem 110 generally includes a rake receiver and a searcher receiver. The searcher receiver detects pilot signals received by the radiotelephone 104 from the plurality of base stations including the base station 102. The searcher receiver despreads pilot signals using a correlator with system PN codes generated in the radiotelephone 104 using local reference timing. The searcher receiver includes one or more sequence generators such as linear sequence generator (LSG) 120 for generating the PN codes. The modem 110 correlates the locally generated PN codes with the received CDMA signals. The modem 110 detects system timing indicators transmitted by the radiotelephone system 100. Specifically, the modem 110 detects PN rollover boundaries in the CDMA signal and provides an indication of the PN rollover boundaries to the timing controller 114. The modem also includes circuitry for transmitting data from the radiotelephone 104 to base stations such as base station 102. The modem 110 may be constructed from conventional elements.

The call processor 112 controls the functions of the radiotelephone 104. The call processor 112 operates in response to stored programs of instructions and includes a memory for storing these instructions and other data. The call processor 112 has a clock input 122 for receiving a clock signal and an interrupt input 124 coupled to the timing controller 114 for receiving interrupt request signals. The call processor 112 receives from the base station 102 the interval on which the radiotelephone must look for pages. Over this interval, the radiotelephone monitors the paging channel for up to 160 ms and can sleep the remainder of the time. The call processor 112 coordinates the events in the radiotelephone 104 required for entry into and exit from sleep mode. Such events include keeping track of system time, advancing LSG states, restarting the oscillator 116, enabling power to the RF portion 109 in the analog front end 108, and restarting the clock from the timing controller 114 to the modem 110. The call processor 112 is coupled to other elements of the radiotelephone 104. Such connections are not shown in FIG. 1 so as to not unduly complicate the drawing figure.

The user interface 118 permits user control of the operation of the radiotelephone 104. The user interface 118 typically includes a display, a keypad, a microphone and an earpiece. The user interface 118 is coupled to the call processor 112 by a bus 152.

The timing controller 114 controls timing of the radiotelephone 104. In particular, the timing controller 114 controls entry to and exit from slotted paging mode by the radiotelephone 104 and synchronization of local timing of the radiotelephone 104 and system timing of the radiotelephone system 100. The timing controller 114 has a clock input 130 for receiving a clock signal from the oscillator 116, an interrupt input 131 for receiving interrupt requests from the user interface 118, and an interrupt input 132 for receiving interrupt requests from other components of the radiotelephone 104.

The timing controller 114 has a timing input 134 for receiving timing signals from the modem 110 and a timing output 136 for providing timing signals to the modem 110. The timing signals (labeled PNSTROBE in FIG. 1) received from the modem 110 correspond to PN roll boundaries of the radiotelephone's short PN sequence synchronized to the base station. A PN roll boundary is defined as the return of the short PN sequence to its initial value. The PNSTROBE is a series of pulses every 26⅔ ms synchronized to the PN roll boundary. The timing signals (labelled CHIPX8 in FIG. 1) provided to the modem 110 are clock signals at a rate eight times the chip rate, or 8×1.2288 Mega-chips per second. Other suitable rates may be used. When this timing signal is removed from the modem 110, the modem 110 enters a low power mode and all internal states are frozen.

The oscillator 116 is a reference oscillator for generating a reference clock signal at a first rate. In the illustrated embodiment, the oscillator 116 is a fine resolution clock which produces a highly accurate, fine resolution clock signal such as a 16.8 MHz clock signal. The timing controller 114 has a control output 138 for providing a control signal to the oscillator 116. In response to the control signal, the oscillator 116 is selectively activated and inactivated.

When inactivated, the oscillator enters a low power mode. The timing controller 114 further provides a control signal (labelled RXCTRLB in FIG. 1) to the analog front end 108. In response to this control signal, a portion of the analog front end 108 is selectively powered down.

Figure 2:
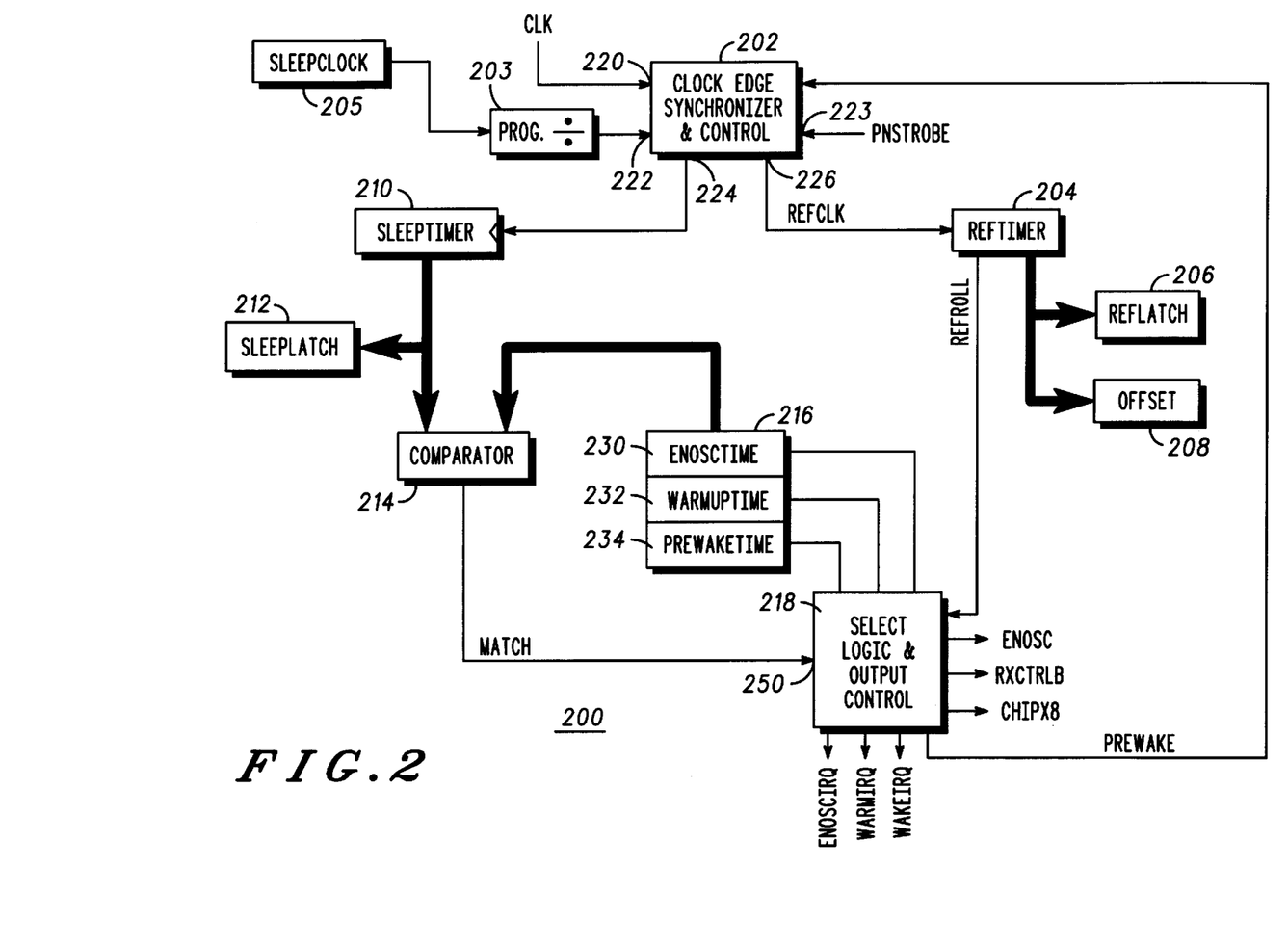
FIG. 2 is a block diagram of a portion of the radiotelephone of FIG. 1.

Referring now to FIG. 2, a sleep time controller 200 of the timing controller 114 includes a clock edge synchronizer 202, a programmable divider 203, a sleep clock generator 205, a reference timer 204, a reference latch 206, an offset latch 208, a sleep timer 210, a sleep latch 212, a comparator 214, registers 216, and select logic 218. Under control of the call processor 112, the sleep time controller 200 places the radiotelephone 104 in a low power sleep mode having a duration based on the timing accuracy of the sleep clock generator 205. In the sleep mode, the sleep time controller 200 simulates system timing until end of the sleep duration determined by the call processor 112 (FIG. 1).

The call processor 112 determines timing of one or more events for reactivating the radiotelephone 104 from sleep mode. In the illustrated embodiment, the call processor calculates an enable oscillator time for restarting the oscillator 116, a warmup time for reactivating a portion of the RF portion 109 of the analog front end 108, and a pre-wake time for restarting a reference timer used for obtaining fine timing resolution necessary for restarting the CHIPX8 clock signal to the modem.

The sleep clock generator 205 generates a sleep clock signal. The sleep clock generator 205 is a coarse resolution clock which generates a coarse resolution clock signal, the sleep clock signal. The sleep clock generator 205 produces the sleep clock signal at a second clock rate which is different from the first clock rate of the oscillator 116. In the illustrated embodiment, the sleep clock signal is a 32 KHz signal, but any suitable frequency may be used. The programmable divider divides the sleep clock frequency by, for example, powers of 2 in the range 1, 2, 4, . . . 128.

The clock edge synchronizer 202 has a fast clock input 220 for receiving a highly accurate clock signal from the oscillator 116 (FIG. 1), a sleep clock input 222 for receiving the sleep clock signal which has been divided down by the programmable divider 203, and a PN roll input 223 for receiving the PNSTROBE signal from the modem 110 (FIG. 1).

The clock edge synchronizer 202 provides two clock signals. At a first output 224, the clock edge synchronizer 202 provides a sleep clock signal. In the illustrated embodiment, the sleep clock signal is a low speed, coarse resolution clock signal, having a rate of 32 KHz divided by the programmable divider 203. At a second output 226, the clock edge synchronizer 202 provides a reference clock signal. In the illustrated embodiment, the reference clock signal is a high speed (e.g., 16.8 MHz), fine resolution clock signal. The reference clock signal is turned off during sleep mode to conserve battery power in the radiotelephone. The clock edge synchronizer 202 synchronizes the various asynchronous clock edges to provide appropriate clock and latching signals.

In addition, the timing controller 114 places a portion of the CDMA radiotelephone 104, including the oscillator 116, in a low power sleep mode. The timing controller 114 times a duration of the low power sleep mode utilizing the coarse resolution clock signal. The clock edge synchronizer 202 synchronizes timing of the CDMA radiotelephone to system timing of the CDMA radiotelephone system using the fine resolution clock signal. The clock edge synchronizer 202 removes the CDMA radiotelephone from the low power sleep mode substantially synchronized with system timing.

In one mode of operation, the timing controller 114 measures duration of one or more of the coarse resolution clock or sleep clock periods using the fine resolution clock signal from the oscillator 116. This is done by counting the number of complete reference clock periods which occur over an integer number of sleep clock periods.

The radiotelephone 104 enters a low power sleep mode for a time duration that is based on sleep clock periods. The measurement of the sleep clock period can be improved by counting a larger number of sleep clock signal periods and reference clock signal periods. The better the measurement accuracy, the longer the time duration of the sleep mode may be extended while still permitting exit from the sleep mode substantially synchronously with a PN roll boundary.

For timing control, the call processor 112 keeps track of PN roll boundaries, too, and uses them to know what the system time is. In order to know the values of the sleep timer 210 and the reference timer 204 at a future action time, the call processor must have four pieces of information. The first is the duration of the one sleep clock period. The second is the system time at the last PN roll boundary. The third is the contents of the sleep timer 210 at the time of the last PN roll boundary. The fourth is the difference between occurrence of the PN roll boundary and the next rising edge of the sleep clock signal. This fourth piece of information is necessary to provide the fine timing necessary to resolve time to an accuracy of a period of the reference clock. To provide this information, the sleep timer 210 counts periods of the sleep clock signal and the reference timer 204 counts periods of the reference clock signal.

The sleep latch 212 is coupled to the sleep timer 210 for storing contents of the sleep timer 210 at a first predetermined time. On rising edges of the sleep clock signal, including as the radiotelephone 104 prepares to enter sleep mode, the current value of the sleep timer 210 is stored in the sleep latch 212. The value is latched just after the rising edge of the sleep clock signal following a PN roll boundary indicated by the PNSTROBE signal at the input 223. This value is used by the call processor 112 to compute wakeup times by storing a copy of the system time. In the illustrated embodiment, the sleep timer 210 and the sleep latch 212 are both 16 bits wide.

The reference latch 206 is coupled to the reference timer 204 for storing contents of the reference timer 204 at the first predetermined time or any suitable time. The current value of the reference timer 204 is stored in the reference latch 206 just after each rising edge of the sleep clock signal following a PN roll boundary indicated by the PNSTROBE signal at the input 223. The reference latch 206 counts the number of reference clock periods that occur over the number of sleep clock periods indicated by the value stored in the sleep latch 212. In the illustrated embodiment, the reference timer 204 and the reference latch 206 are both 24 bits wide.

The offset latch 208 is coupled to the reference timer 204 for storing the contents of the reference timer 204 at a second predetermined time. The value is latched immediately after a PN roll boundary indicated by the PN strobe signal at the input 223. The current value of the reference timer 204 is stored in the offset latch 208 just after the first rising edge of the sleep clock signal following a PN roll boundary indicated by the PNSTROBE signal at the input 223. The value stored in the offset latch 208 is subtracted from the contents of the reference latch 206 to yield the time since the last PN roll boundary. Thus, the offset latch stores a time from a last received system timing reference to the first predetermined time. In the illustrated embodiment, the offset latch is 24 bits wide.

The comparator 214 compares the contents of the sleep timer 210 and the contents of one of the registers 216. The comparator 214 provides a match signal to the select logic 218. The registers 216 store data corresponding to one or more predetermined event times, the predetermined event times corresponding to wake up events. In the illustrated embodiment, a first register 230 stores an enable oscillator time corresponding to a sleep count at which the oscillator 116 is to be enabled. A second register 232 stores a warmup time corresponding to a sleep timer count when a portion of the analog front end 108. A third register 234 stores a pre-wake time corresponding to a sleep clock count when the reference timer 204 is to be reactivated.

Figure 3A:
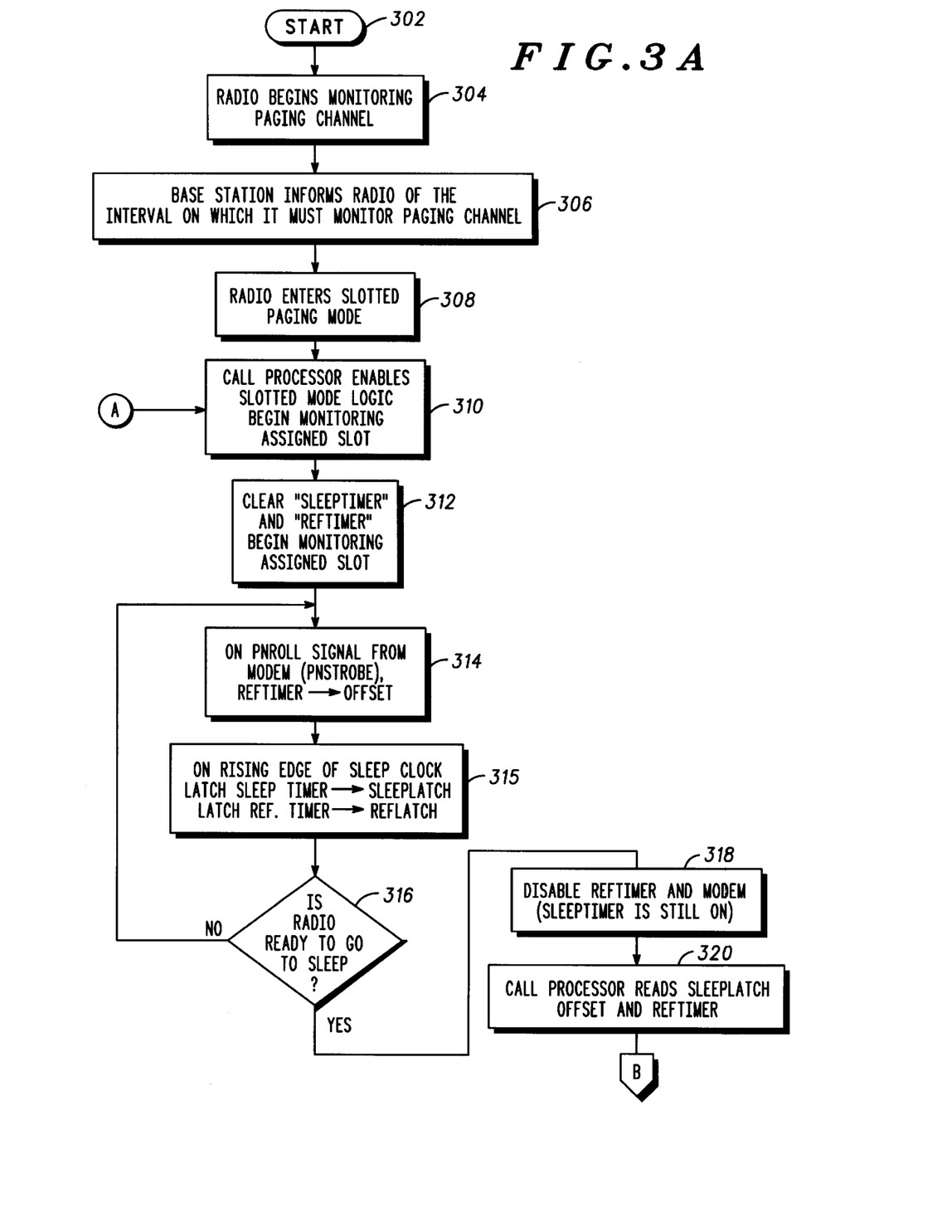
FIG. 3A and FIG. 3B are a flow diagram illustrating operation of the radiotelephone of FIG. 1.
Figure 3B:
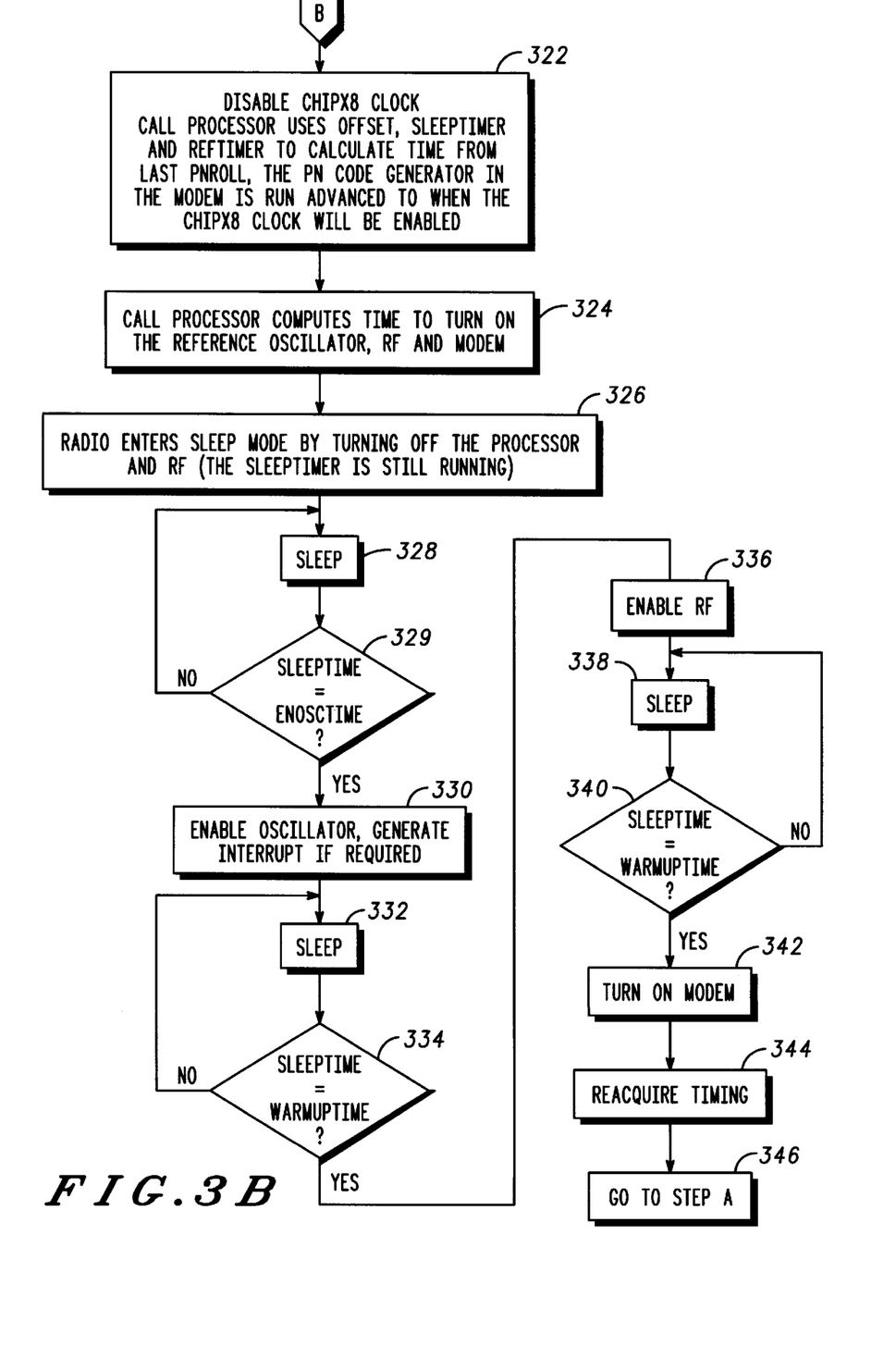

FIG. 3A and FIG. 3B are a flow diagram illustrating operation of the radiotelephone 104 of FIG. 1 for entering and exiting slotted paging mode. FIG. 3A and 3B will be described in conjunction with FIG. 4A and FIG. 4B, which is a timing diagram illustrating timing relationships of signals in the radiotelephone 104 operated in accordance with the present invention. The method begins at step 302.

Figure 4A:
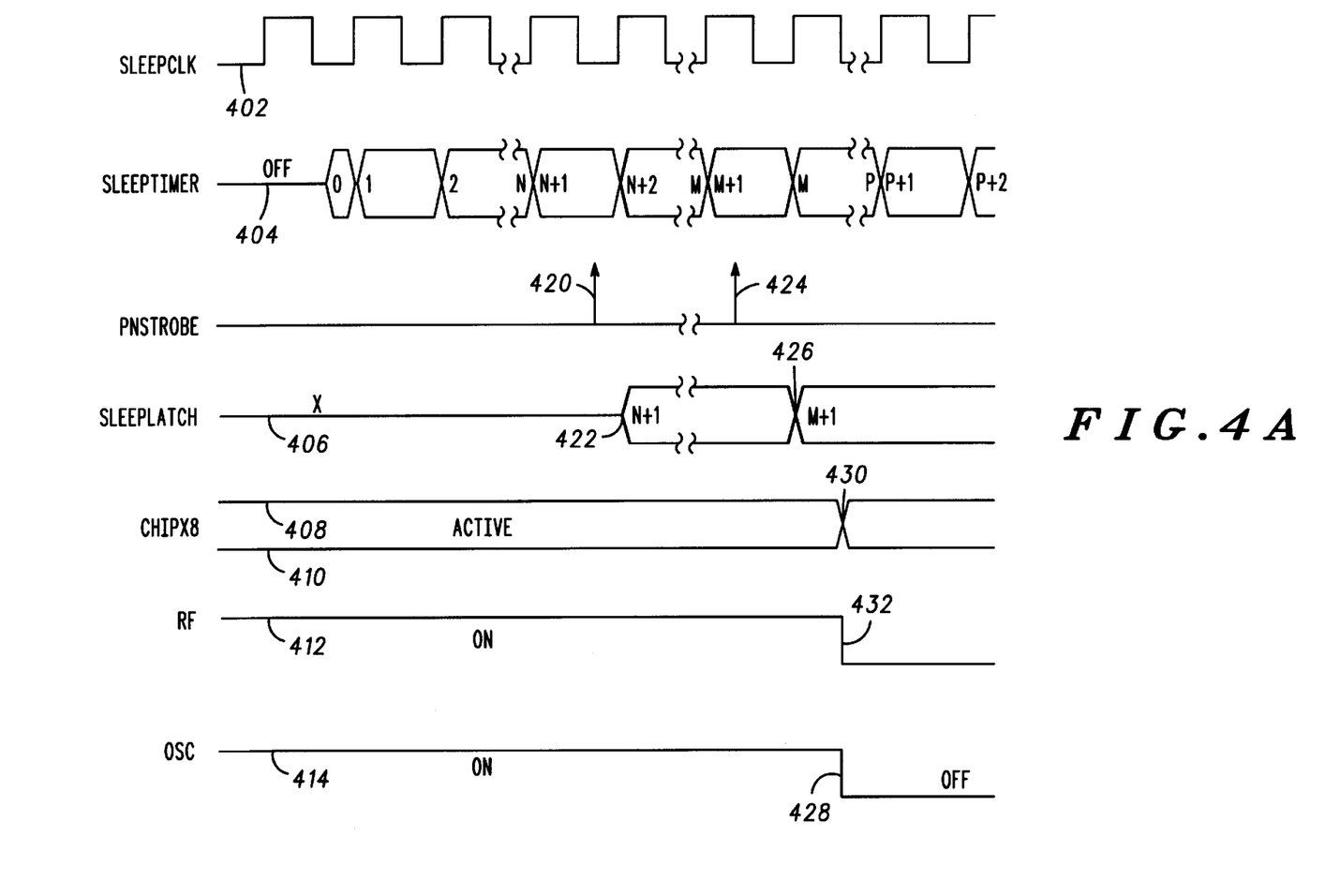
FIG. 4A and FIG. 4B are a timing diagram for the radiotelephone of FIG. 1.

At step 304, the radiotelephone 104 receives a CDMA signal from a base station and monitors the paging channel for pages directed by a base station such as base station 102 to the radiotelephone 104. Initially, the clock edge synchronizer 202 provides the sleep clock signal 402 at a predetermined frequency, such as 32 KHz, the sleep timer 210 is off 404 and the sleep latch 212 does not contain a valid value 406. Similarly, at the beginning of the method, with the radiotelephone 104 in an active mode, the CHIPX8 clock is active, point 408, 410, RF portion 109 of the analog front end 108 are powered on, point 412, and the oscillator 116 is powered on, point 414. At step 306, the base station 102 informs the radiotelephone 104 of the time interval at which the radiotelephone 104 should wake up and look for pages.

Figure 4B:
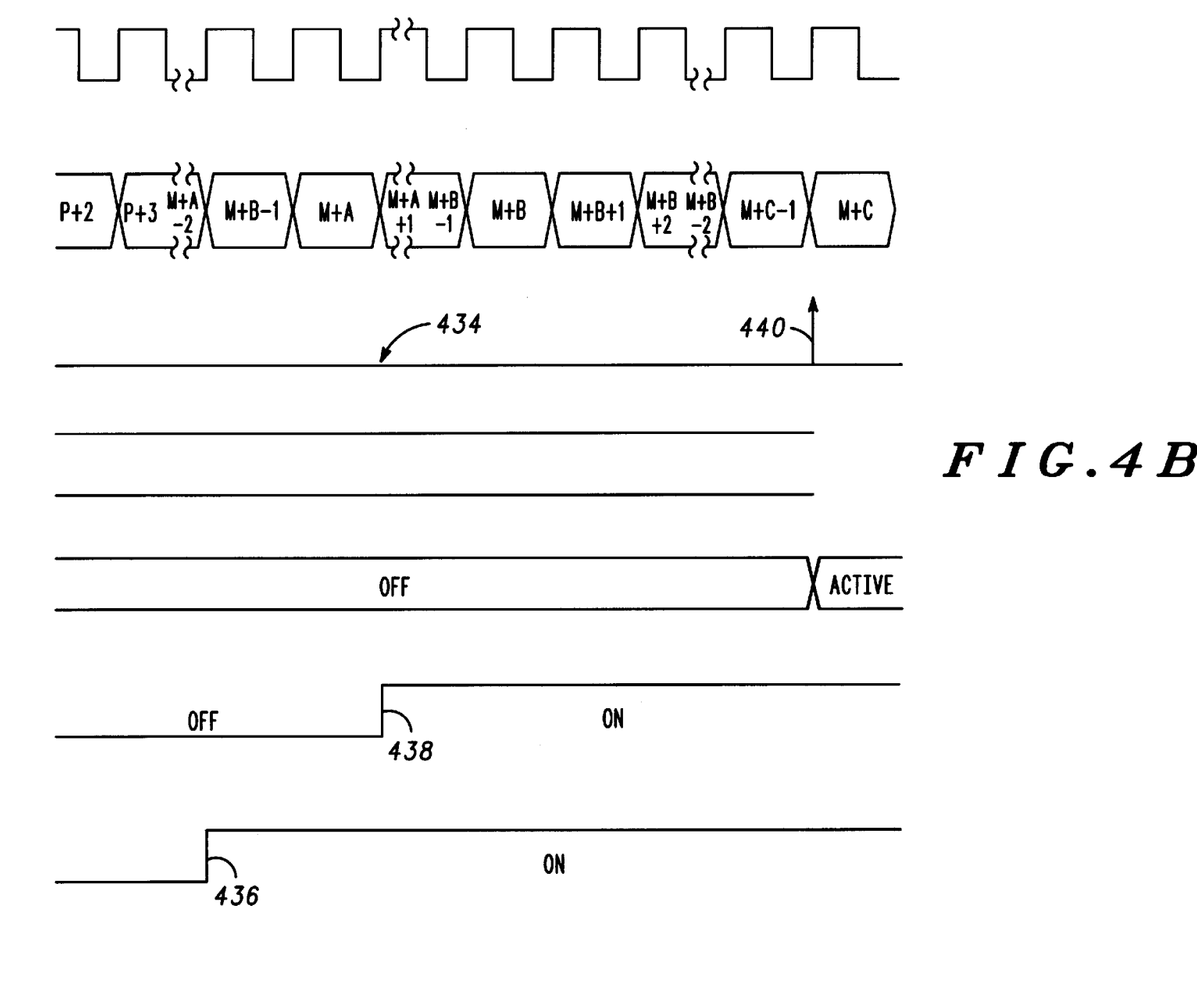

At step 308, the radiotelephone enters slotted mode. At step 310, the call processor 112 enables the slotted mode logic of the sleep time controller 200. At step 312, the radiotelephone 104 resets the sleep timer 210 and the reference timer 204 and begins monitoring its assigned slot. The sleep timer 210 begins counting the number of edges of the sleep clock signal 402. In FIG. 4A and FIG. 4B, the number shown adjacent to the sleep timer edges corresponds to the contents of the sleep timer 210, starting at the reset value 0 and incrementing by one with each rising edge of the sleep clock signal 402. The reference clock signal and reference timer 204 operate in similar fashion.

At step 314, a system timing indicator such as a PN roll boundary 420 is detected. The PN roll boundary 420 and subsequent PN roll boundaries correspond to the PN roll boundaries of system timing. Other system timing indicators may be used, but the PN roll boundaries are well suited because they occur with precise regularity at short period (26⅔ ms). In response to the PN roll boundary 420, the current value of the reference timer 204 is latched into the offset latch 208 at point 420. At step 315, the first rising edge following the PN roll boundary causes the sleep timer value to be latched into the sleep latch 212 and the reference timer value to be latched into the reference latch 206. The radiotelephone 104 operates in a loop including step 314 and step 316 while monitoring the paging channel until, at step 316, the radiotelephone 104 is ready to go to sleep.

At step 316, the call processor 112 determines that it is time for the radiotelephone 104 to go to sleep. At step 318, the call processor 112 disables the reference timer 204 and the modem 110. The RF portion 109 of the analog front end 108 is also powered down, point 432. The sleep timer 210 remains active. At step 320, the call processor 112 reads the value of the sleep latch 212. The call processor 112 also reads the values in the offset latch 208 and in the reference timer 204. These values yield the time of the previous PN roll boundary 424. The call processor 112 then determines a wakeup time. The call processor 112 calculates one or more wakeup times for exiting the sleep mode. The call processor 112 computes the times the timing controller 200 should wake up different parts of the radio and writes data corresponding to those times to the registers 216.

At step 322, the CHIPX8 clock to the modem 110 is disabled. The call processor 112 uses the contents of the sleep timer 210, the reference timer 204 and the offset latch 208 to calculate the time from the last PN roll boundary. Also, the call processor 112 advances the LSG 120 of the modem 110 ahead to the time when the CHIPX8 clock will be restarted.

At step 324, the call processor 112 computes the time to turn on the oscillator 116, the RF portion 109 of the analog front end 108 and the modem 110. The call processor 112 performs timer computations as follows:

wake_time=system time at which the modem 110 will wake up and attempt to reacquire the system.

latched_pn_time=system time of the PN roll on which the contents of the two timers was latched prior to going to sleep.

osc_warm_time=the amount of time the oscillator 116 needs to be on before the output is locked and stable.

RF_warm_time=the amount of time the RF portion 109 of the analog front end 108 needs to be on before providing useful output.

Sleep clock frequency estimate: $f_{sleep}=f_{ref}$ * (sleep latch value/reference latch value).

Sleep clock time offset from latched_pn_time to first sleep clock signal edge: $t_{offset}$=offset latch value * $f_{ref}$.

Value to program into the reference timer register: REFTIMER=$(2^{23}-1)$-Truncate[($f_{ref}$ * (wake_time-(pre-wake time/$f_{sleep}$)))].

Value to program into the pre-wake time register: PREWAKETIME=Truncate[(wake_time-(latched pn_time+$t_{offset}$)) * $f_{sleep}$].

Value to program into the warmup time register: WARMUPTIME=PREWAKETIME-Truncate[RF_warm_time * $f_{sleep}$].

Value to program into the enable oscillator time register: ENOSCTIME=WARMUPTIME-Truncate[osc_warm_time * $f_{sleep}$)], Using the timing diagram of FIG. 4A and FIG. 4B, ENOSCTIME=M+A; WARMUPTIME=M+B; and PREWAKETIME=M+C, where A>(P-M)+1,B>A, and C>B.

At step 326, the radiotelephone 104 enters a low power sleep mode. The oscillator 116 is powered down by removing power to the oscillator 116, point 428. The CHIPX8 clock signal from the timing controller 114 to the modem 110 is stopped, point 430. In sleep mode, step 328, any other suitable portions of the radiotelephone 104 are shut down, consistent with the goal of slotted mode operation of reducing the on time of the radiotelephone 104 to a minimum and of powering down as much of the radiotelephone 104 as possible during sleep periods.

The sleep time controller 200 times a sleep duration using a coarse resolution clock. During sleep mode, timing is performed by the sleep timer 210 in response to the sleep clock signal. Thus, in the sleep mode, the sleep time controller 200 simulates system timing until end of the sleep duration defined by the events stored in the registers 216.

While the radiotelephone 104 is asleep, it does not receive any PN roll information in the form of PN roll boundaries, point 434, since the RF portion 109 of the analog front end 108 and the modem 110 are powered down.

During the sleep time, the contents of the sleep timer 210 and the contents of the first register 230 are provided to the comparator 214, step 329. The method remains in a loop including step 328 and step 329. When the contents of the sleep timer 210 equals the contents of the first register 230 (ENOSCTIME), a match signal is provided to an input 250 of the select logic 218. In response, at step 330, the select logic 218 provides a signal (labelled ENOSC in FIG. 2) to restart the oscillator 116, point 436. The radiotelephone 104 continues in sleep mode, step 332.

Subsequently, the contents of the sleep timer 210 and the contents of the second register 232 are compared in the comparator 214, step 334. The method remains in the loop including step 332 and step 334. When the value in the sleep timer 210 equals WARMUPTIME, a signal is asserted to cause clocking signals to be provided to the input 122 of the call processor 112 (FIG. 1) and, at step 336, to turn on the RF portion 109 of the analog front end 108, point 438. The radiotelephone 104 continues in sleep mode, step 338.

Subsequently, the contents of the sleep timer 210 and the contents of the third register 234 are compared in the comparator 214, step 340. The method remains in the loop including step 338 and step 340. When the value in the sleep timer 210 equals PREWAKETIME, a pre-wake signal is asserted by the select logic 218. This indicates the time that the radiotelephone 104 expects to receive its slotted paging mode data. The pre-wake signal is provided to the clock edge synchronizer 202, re-enabling the reference clock signal and starting the reference timer 204. This is synchronized to system timing by synchronizing to a received PN roll boundary 440 received at the PNSTROBE input 223. The reference timer 204 is needed to get the fine resolution necessary to restart the CHIPX8 clock.

The reference timer 204 receives the reference clock signal and counts down the time between the pre-wake time and the wakeup time. When the reference timer 204 rolls over, indicating the wakeup time, the reference timer 204 provides a signal (labelled REFROLL in FIG. 2) to the select logic 218. In response to this signal, the select logic 218 provides a signal to the modem such as CHIPX8. The signal is provided substantially synchronized with a received PN roll boundary. Thus, the sleep time controller 200 synchronized timing of the radiotelephone 104 to system timing using a fine resolution clock, the reference clock signal provided to the reference timer 204.

In response to the reference timer, the CHIPX8 clock signal is provided to the modem, step 342. Since the PN code sequence generators for the short PN sequence and the long PN sequence, LSG 120, have been previously moved forward, the modem 110 can search over a narrow window of time uncertainty in order to reacquire the system and begin decoding the paging channel. The radiotelephone receives its paging information during its assigned paging slot, step 344, then repeats the method, step 346.

Figure 5:
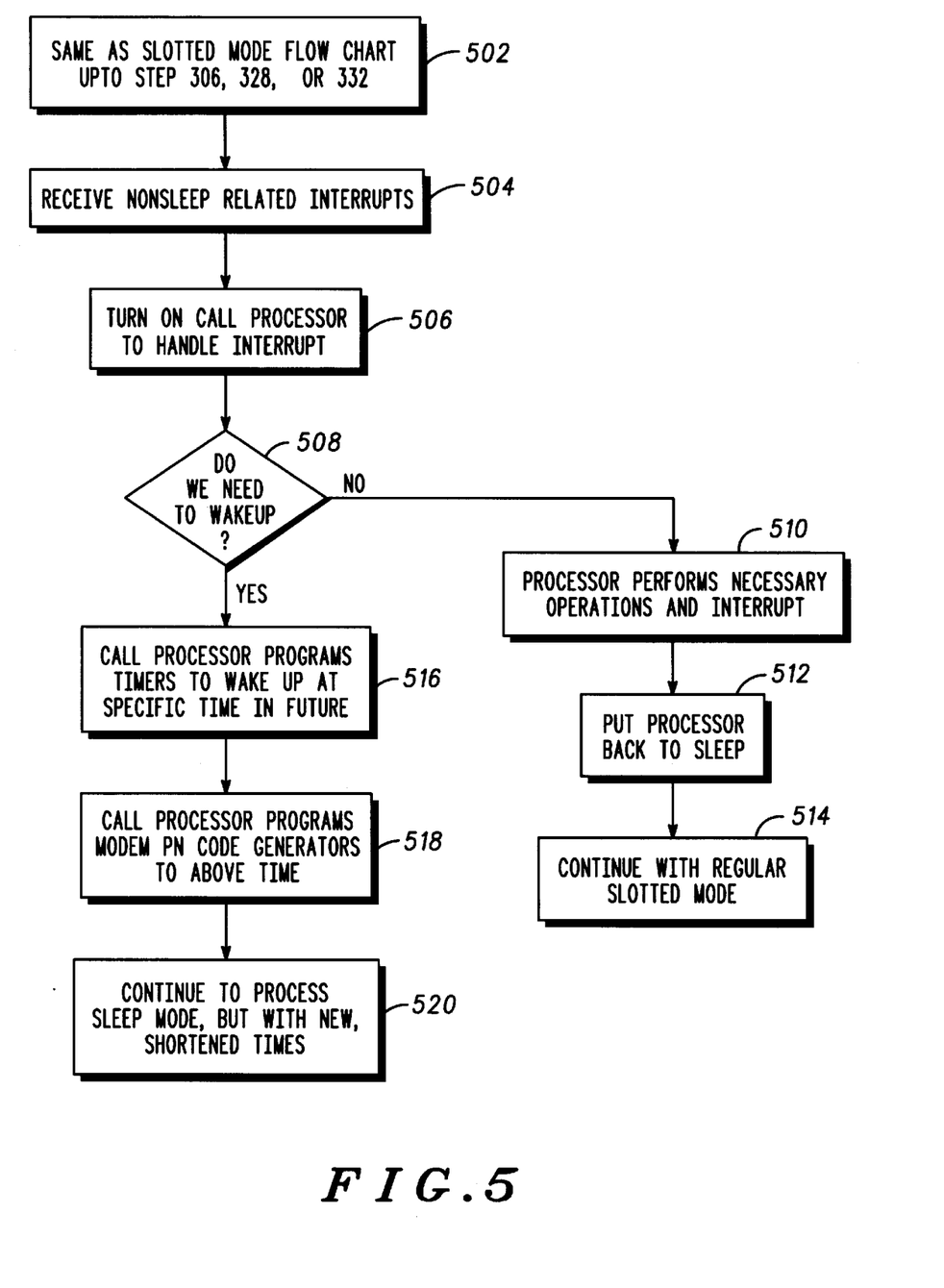
FIG. 5 is a flow diagram illustrating operation of the radiotelephone of FIG. 1.

Referring now to FIG. 5, it shows a flow diagram for a method in accordance with the present invention of processing non-sleep related interrupts in the radiotelephone of FIG. 1 during slotted paging mode operation. As is indicated in FIG. 5, step 502, interrupts are detected and processed at any of step 306, step 328 or step 332 of FIG. 3A and FIG. 3B.

In the illustrated embodiment, the timing controller 114 (FIG. 1) is configured to receive interrupt signals at the interrupt input 132. At step 504, an interrupt signal is received at the interrupt input 132. In response to the interrupt signal, the timing controller 114 activates the call processor 112, for example, by providing clock signals to the input 122 and an interrupt request to the interrupt input 124, to handle the interrupt.

At step 508, the call processor 112 determines if the radiotelephone needs to wake up to process the interrupt. The radiotelephone 104 will have to wake up to process an interrupt, for example that requires the radiotelephone 104 to originate a call or change operational modes. If the radiotelephone does not need to wake up, at step 510 the call processor 112 executes the necessary operations and clears the interrupt request received at the interrupt input 124, step 510. At step 512, the call processor 112 is de-activated, returning to the low-power sleep mode. At step 514, the method continues with regular slotted mode operation described above in conjunction with FIG. 3A and FIG. 3B.

If, at step 508, the call processor 112 determined that the radiotelephone 104 needs to wake up to process the interrupt, at step 516 the call processor 112 determines a point in the future at which the modem 110 will begin monitoring the channel. The call processor 112 programs the sleep timer 210 and the reference timer 204 to wake up the radiotelephone 104 at this new time. At step 518, the call processor programs the LSG 120 in the modem 110 to correspond to the same point in time. At step 520, the radiotelephone 104 continues processing sleep mode as illustrated in FIG. 3A and FIG. 3B, but using the time values and the PN roll boundary determined in step 516 and step 518.

As can be seen from the foregoing, the present invention provides a radiotelephone and a method for operating a radiotelephone in slotted paging mode. Prior to entering a low power sleep state, the radiotelephone calculates the time to wake up and other intermediate times corresponding to wake up events. These include the time to restart an oscillator, the time to activate RF circuitry and the time to start clocking a modem. Also, before entering sleep, the radiotelephone determines the linear sequence generator state required at the wake up time and advances the LSG in the modem ahead to that value. During sleep mode, a sleep timer simulates system timing to provide an indication when to exit sleep mode. Duration of the sleep mode is timed using a coarse resolution clock signal. At the end of the sleep mode, local timing is precisely aligned with system timing using a fine resolution clock signal. Also, the radiotelephone and method provide for immediate processing of non-sleep related interrupts. Thus, the radiotelephone reduces its on time in slotted paging mode to the absolute minimum and powers down as much of the radiotelephone as possible during sleep periods.

While a particular embodiment of the present invention has been shown and described, modifications may be made. It is therefore intended in the appended claims to cover all such changes and modifications which fall within the true spirit and scope of the invention.

What is claimed is:

1. A method for operating a Code Division Multiple Access (CDMA) radiotelephone in a slotted paging mode, the CDMA radiotelephone operable in a CDMA radiotelephone system, the method comprising the steps of:

(a) determining a wakeup time;

(b) synchronizing a sleep clock signal to a received pseudorandom noise (PN) rollover boundary, thereby synchronizing the sleep clock signal with a system time of the radiotelephone system, and storing the system time and a future linear sequence generator (LSG) state;

(c) entering a sleep mode, interrupting communication;

(d) in the sleep mode, simulating system timing until end of the wakeup time; and (e) resuming communication using the future LSG state.

2. A method as recited in claim 1 wherein step (b) comprises the steps of:

(b1) determining the system time corresponding to a last pseudorandom noise (PN) rollover boundary; and (b2) calculating a pre-wake time corresponding to a time when the radiotelephone will receive slotted paging mode data from the radiotelephone system.

3. A method as recited in claim 2 wherein step (b) further comprises the steps of:

(b3) determining as the future LSG state a PN code sequence corresponding to the pre-wake time, the PN code sequence for synchronizing timing of the radiotelephone and the radiotelephone system; and (b4) before entering the sleep mode, advancing a PN code generator of the radiotelephone to the future LSG state for communication with the radiotelephone system.

4. A method as recited in claim 3 wherein step (e) comprises the steps of:

(e1) detecting the pre-wake time;

(e2) detecting a next PN rollover boundary; and (e3) in response to the next PN rollover boundary, applying clocking signals to the PN code generator to immediately begin decoding a communication channel from the radiotelephone system to the radiotelephone.

5. A method as recited in claim 1 further comprising the steps of:

incrementing a sleep timer using the sleep clock signal;

when the sleep timer corresponds to a first predetermined time, reactivating an oscillator of the radiotelephone;

when the sleep timer corresponds to a second predetermined time, reactivating a receiver of the radiotelephone; and when the sleep timer corresponds to a third predetermined time, decoding a communication channel detected by the receiver to resume communication with the radiotelephone system.

6. A method as recited in claim 1 further comprising the steps of:

while in the sleep mode, receiving an interrupt;

determining a next PN roll boundary;

determining an interrupt service time corresponding to the next PN roll boundary;

determining a new future LSG state corresponding to the next PN roll boundary;

returning to the sleep mode; and at the interrupt service time, resuming communication using the future LSG state.

7. A method for operating a radiotelephone in a slotted paging mode in a Code Division Multiple Access (CDMA) radiotelephone system, the radiotelephone including a processor, a pseudorandom noise (PN) generator, and a receiver configured for communication with a base station, the method comprising the steps of:

receiving a CDMA signal from the base station;

identifying a wakeup time;

detecting PN rollover boundaries in the CDMA signal;

in response to a PN rollover boundary, resetting a sleep timer to synchronize the sleep timer with a system time;

inactivating the processor, the PN generator, and the receiver, interrupting communication with the base station;

generating local timing in response to a timing signal from the sleep timer to simulate system timing and synchronize local timing to the system time;

when local timing corresponds to the wakeup time, activating the processor;

aligning the PN generator to a current system time using a system timing offset; and upon reacquisition of the CDMA signal, resuming communication with the base station.

8. A method as recited in claim 7 further comprising the steps of:

calculating intermediate times for waking up respective portions of the radiotelephone; and when local timing matches a calculated intermediate time, activating a respective portion of the radiotelephone.

9. A method as recited in claim 8 wherein the calculating step comprises calculating an enable oscillator time.

10. A method as recited in claim 8 wherein the calculating step comprises calculating a warmup time for activating a radio frequency portion of the radiotelephone.

11. A method as recited in claim 7 wherein the step of aligning the PN generator occurs before the step of inactivating.

12. A radiotelephone operable in a slotted paging mode, the radiotelephone comprising:

a modem for detecting pseudorandom noise (PN) roll boundaries in system timing;

a call processor for controlling entry to a sleep mode by the radiotelephone, the call processor configured to calculate one or more wake up times for exiting the sleep mode;

a timing controller including:

registers for storing the one or more wakeup times;

a sleep timer for generating local timing, the sleep timer synchronizing the local timing to system timing using the PN roll boundaries;

a comparator for comparing local timing and the one or more wakeup times; and select logic for restarting portions of the radiotelephone when local timing matches a wakeup time.

13. A radiotelephone as recited in claim 12 wherein the radiotelephone further comprises a radio frequency (RF) portion, the call processor calculating a warmup time for re-activating the RF portion.

14. A radiotelephone as recited in claim 12 wherein the radiotelephone further comprises an oscillator, the call processor calculating an enable oscillator time for re-starting the oscillator.

15. A radiotelephone as recited in claim 12 wherein the modem comprises a PN sequence generator for generating a local PN sequence, the call processor advancing the PN sequence generator to a state corresponding to a wakeup time before entering the sleep mode.

16. A method for operating a radiotelephone system which includes at least one base station and at least one radiotelephone, the method comprising the steps of:

at a base station, maintaining a system time;

transmitting a code division multiple access (CDMA) signal including periodically timed PN rollover boundaries;

at a radiotelephone, receiving the CDMA signal;

detecting the PN rollover boundaries in the CDMA signal;

in response to a PN rollover boundary, resetting a sleep timer to synchronize local timing with the system time;

inactivating a portion of the radiotelephone, interrupting communication with the base station;
generating local timing to simulate system timing;
when local timing corresponds to the wakeup time, activating the portion of the radiotelephone;
aligning local timing to a current system time using a system timing offset; and
upon reacquisition of the CDMA signal, resuming communication with the base station.

17. A method as recited in claim 16 further comprising the steps of:
   calculating intermediate times for waking up respective sub-portions of the radiotelephone; and
   when local timing matches a calculated intermediate time, activating a respective sub-portion of the radiotelephone.

* * * * *